United States Patent

[11] 3,557,922

[72] Inventor  Hans Joachim Schwerdhoefer
              Schweinfurt Am Main, Germany
[21] Appl. No. 838,524
[22] Filed     July 2, 1969
[45] Patented  Jan. 26, 1971
[73] Assignees Fichtel & Sachs AG
              Schweinfurt AM Maim, Germany;
[32] Priority  July 4, 1968
[33]           Germany
[31]           1,755,878

[54] CENTRIFUGAL GOVERNOR FOR A MULTIPLE-SPEED HUB
     10 Claims, 10 Drawing Figs.
[52] U.S. Cl. .................................... 192/64,
                                    74/752, 192/103
[51] Int. Cl. ...................................... F16d 23/00,
                                    F16d 43/06, F16b 3/74
[50] Field of Search ............................ 74/752(B1)
                                    192/64, 103(B)

[56]           References Cited
               UNITED STATES PATENTS
     2,910,157 10/1959  Gleasman .................... 74/752B1
     3,494,227  1/1970  Shimano et al. ............... 74/752B1

Primary Examiner—Leonard H. Gerin
Attorney—Low & Berman

ABSTRACT: A pawl-and-ratchet coupling in a multiple-speed bicycle hub which is engaged and disengaged to shift the transmission ratio of the hub is controlled by cams on an annular control member interposed axially between the pawl carrier of the coupling and flyweights pivotally mounted on axial pins fastened to the pawl carrier and passing through the control member. The control member is moved angularly relative to the pawl carrier by a pin on one of the flyweights engaging a recess in the control member so that the cams on the control member retract or release the pawls of the coupling as the centrifugal forces acting on the flyweights increase and decrease.

3,557,922

3,557,922

1

CENTRIFUGAL GOVERNOR FOR A MULTIPLE-SPEED HUB

BACKGROUND OF THE INVENTION

This invention relates to automatically shifting multiple-speed hubs for bicycles and like vehicles, and particularly to a centrifugal governor for shifting the hub between its several transmission ratios.

Known multiple-speed hubs are equipped with pawl-and-ratchet couplings so arranged that the hub shifts between a higher and a lower transmission ratio when the coupling is engaged and disengaged. It is also known to rely on centrifugal weights arranged in the hub shell for controlling the coupling.

The known devices, and particularly their centrifugal governors are relatively complex due to a multiplicity of moving parts which increase the cost of the hub, occupy more space than can conveniently be spared in the limited space within a bicycle wheel hub of the generally desired small diameter, and require careful and costly maintenance for continuous satisfactory performance over reasonable periods.

The object of the invention is the provision of a centrifugal governor arrangement of the general type described which can be assembled from a small number of inexpensive parts and is very rugged and compact, having particularly small dimensions in the direction of the hub axis so as to leave space in the hub for a coaster brake or other device.

Other features, additional objects, and many of the attendant advantages of this invention will readily become apparent from the following detailed description of preferred embodiments when considered in connection with the appended drawing.

DESCRIPTION OF THE PREFERRED EMBODIMENTS

Figure 1:
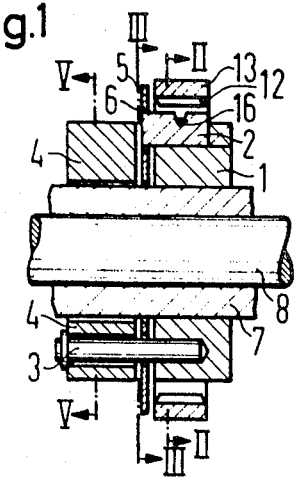
FIG. 1 shows the centrifugal governor of the invention for a multiple speed bicycle hub in side elevational section on the hub axis.
Figure 2:
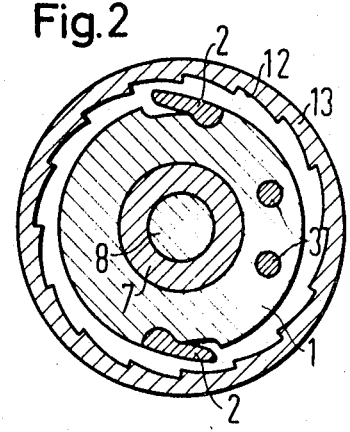
FIGS. 2 and 3 illustrate the governor of FIG. 1 in radial sections on the lines II-II and III-III respectively.

Referring initially to FIGS. 1, 2, 3, and 5, there is shown only as much of an otherwise conventional dual-speed bicycle hub as is needed for an understanding of the invention. The nonillustrated elements include a drive sprocket coaxially fastened to a planet carrier. Planet gears on the carrier simultaneously mesh with a sun gear on the stationary hub shaft and a ring gear. Pawls on the planet carrier normally engage a ratchet on the hub shell to drive the latter at the input speed of the sprocket. The hub shell encloses all the illustrated elements together with the planetary gear transmission. Motion is transmitted from the ring gear to the hub shell when the transmission operates in high gear, and the hub shell overtravels the pawls on the planet carrier.

The drawing only shows a portion of the motion transmitting train for connecting the nonillustrated ring gear with the nonillustrated hub shell and further shows the centrifugal governor which automatically shifts the hub between normal and high gear. The stationary hub shaft 8 carries a sleeve 7

2 which is fixedly connected with the nonillustrated ring gear or an integral portion of the same. An annular pawl carrier 1 is fixedly fastened to the driving sleeve 7 by a shrink fit. Two diametrically opposite pockets in the circumference of the pawl carrier 1, best seen in FIG. 2, hold pivotally arranged pawls 2 which are biased by a pawl spring 16 (FIG. 1) toward driving engagement with internal ratchet teeth 12 on a coupling ring 13, normally fastened to the nonillustrated hub shell. The transmission ratio of the partly illustrated hub is controlled by engagement and disengagement of the pawl-and-ratchet coupling 2,12 in a manner conventional in itself.

Figure 5:
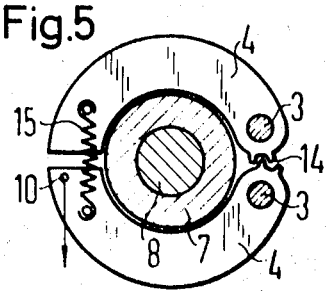
FIG. 5 shows the governor of FIG. 1 in front elevational section of the line V-V.

This invention is more specifically concerned with the centrifugal governor which automatically shifts the hub between normal and high gear at a limiting rotary speed of the pawl carrier 1. Two pins 3 axially project from the pawl carrier in a common axial direction at the same distance from the hub axis and are angularly offset relative to the axis by about 30 Each pin 3 pivotally carries one end of a flyweight 4 which is a metal bar of approximately square cross section bent into an arc of almost 180 The weights 4 jointly envelop the sleeve 7 when held in their inactive position by a helical tension spring 15 which connects the free ends of the weights (FIG. 5). The attached ends of the weights 4 are meshingly connected by respective meshing gear rims 14 centered in the axes of the pivot pins 3.

Figure 3:
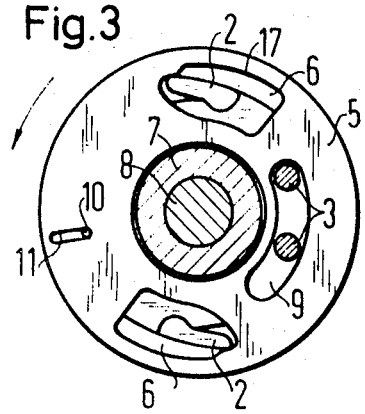

A control disc 5 is axially interposed between the weights 4 and the pawl carrier 1 with enough clearance to permit free angular movement of the disc which also clears the sleeve 7, as is best seen in FIG. 3. The pawls 2 project axially from the carrier 1 toward the weights 4 into two diametrically opposite apertures 6 of the disc 5 which are bounded in a radially outward direction by a cam face 17 of the disc. The pivot pins 3 jointly pass through a slot 9 in the disc which extends between the two apertures 6 about the axis of the hub in a circular arc long enough to permit relative angular movement of the carrier 1 and of the disc through an angle of approximately 30° e tween two terminal positions in which the pins 3 respectively abut against the radial end walls of the slot 9. A radial slot 11 in the disc 5 approximately opposite the slot 9 is engaged by a motion transmitting crank pin 10 axially projection from the free end of one of the flyweights 4.

The aforedescribed apparatus operates as follows:

The pawl carrier 1 is rotated by the sleeve 7 in the counterclockwise direction of the arrow in FIG. 3. The cam faces 17 slope obliquely in a radially inward and counterclockwise direction, and the driving ends of the pawls 2 are held out of engagement with the ratchet teeth 12 by the radially innermost portions of the cam faces 17 when the pawl carrier 1 and the control disc 5 are held in the relative angular position shown in FIG. 3 by the pin 10. No torque is transmitted between the sleeve 7 and the coupling ring 13 as long as the flyweights 4 are held near the sleeve 7 by the spring 15.

When the rotary speed of the sleeve 7 is raised, centrifugal forces acting on the weights 4 can overcome the restraining force of the spring 15, and the free ends of the weights 4 move away from the sleeve 7. The resulting movement of the crank pin 10 has a major circumferential component in the direction of the arrow in FIG. 5, and the pin shifts the control disc 5 from the position seen in FIG. 3 counterclockwise as far as the pivot pins 3 permit. The pawls 2 are released from the radially innermost portion of the cam faces 17 and drivingly engage the ratchet teeth 12 on the ring 13 under the urging of the spring 16. They do not touch the cam faces 17 when engaging the ratchet teeth 12. Torque is thereafter transmitted from the sleeve 7 to the ring 13, and between the nonillustrated ring gear and hub shell by the pawl-and-ratchet coupling 2,12 at the higher transmission ratio of the partly illustrated hub.

When the rotary speed of the pawl carrier 1 drops below the shifting speed so that the spring 15 could overcome the centrifugal forces still acting on the weights 4, the hub does not shift to its lower or normal speed as long as torque is transmitted by the coupling 2,12 and the driving pressure holds the tips of the pawls 2 in engagement with the ratchet teeth 12. If the pedaling effort is relaxed momentarily, the teeth 12 move ahead of the pawls 2, thereby releasing the latter and permitting the spring 15 to return the disc 5 and the pawls 2 to the position shown in FIG. 3 against the weak resistance of the pawl spring 16.

The gear rims 14 couple the flyweights 4 for symmetrical movement relative to the hub axis. It is therefore impossible for the pin 10 to be displaced in the direction of the arrow seen in FIG. 5 by linear inertial forces such as those exerted on the weights when the bicycle runs over an obstacle. A force acting on both weights 4 in the direction of the arrow can swing neither about the associated pivot pin 3 because of the coupling provided by the meshing rims 14 which permits the weights to swing in opposite direction only. Accidental changes in the transmission ratio by jarring movements of the hub are thus prevented.

The hub described with reference to FIGS. 1, 2, 3, and 5 is capable of minor modifications such as that shown in FIGS. 4 and 6 and others that will readily suggest themselves to those skilled in the art on the basis of the instant teachings.

Figure 4:
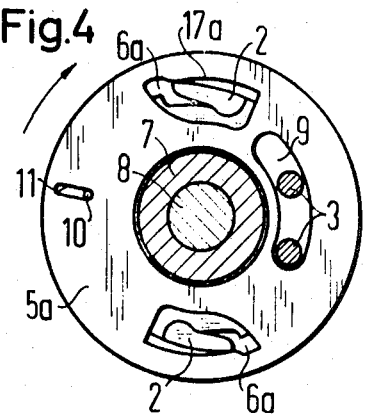
FIG. 4 shows a minor modification of the governor of FIG. 1 in a view corresponding to that of FIG. 3.

The cam faces 17a which bound apertures 6a in the control disc 5a shown in FIG. 4 slope obliquely in the counter-clockwise direction of rotation of the disc and in a radially outward direction. Whereas the pin 10 in FIG. 5 swings counterclockwise about the associated pivot pin 3 as the shifting speed of the pawl carrier 1 is exceeded, the pin 10 in FIG. 6 swings clockwise as indicated by a straight arrow, and thereby turns the control disc 5a clockwise as indicated by a curved arrow in FIG. 4. The clockwise movement of the disc 5a causes the driving tips of the pawls to move toward the radially outermost portion of the cam faces 17a and into engagement with the ratchet teeth 12 of the ring 13. To permit the clockwise movement of the disc 5a relative to the pawl 1 during shifting into high gear, the slot 9 is angularly offset in FIG. 4 from the position shown in FIG. 3.

Figure 6:
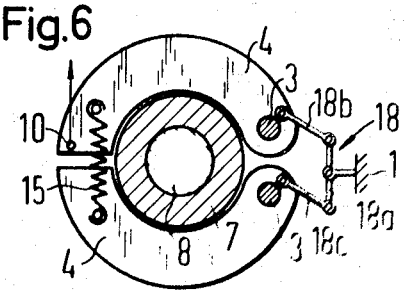
FIG. 6 shows the modified governor of FIG. 4 in a view corresponding to that of FIG. 5.

FIG. 6 also shows a modified coupling between the two flyweights for maintaining their symmetrical position relative to a plane through the hub axis in all their angular positions on the pins 3. The weights 4 are connected by a linkage 18 including a two-armed main lever 18a fulcrumed on the flyweight carrier. The two arms of the lever 18 are pivotally fastened to links 18b, 18c respectively hinged to parts of the weights 4 so positioned that one weight 4 must move counterclockwise if the other moves clockwise on the associated pin 3, and vice versa. The linkage 18 is thus the functional equivalent of the meshing gear rims 14 seen in FIG. 6.

The variations described with reference to FIGS. 4 and 6 do not significantly affect the operation of the modified centrifugal governor which thus needs no further description.

Figure 7:
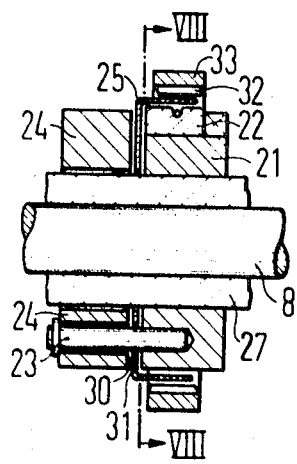
FIG. 7 shows another governor of the invention in side elevational section.
Figure 8:
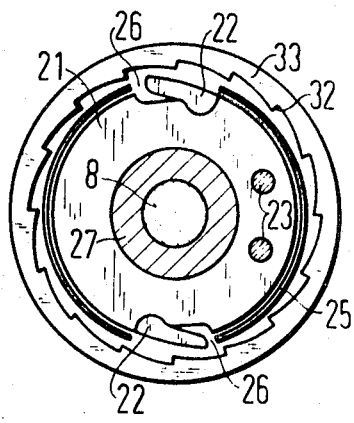
FIG. 8 illustrates the governor of FIG. 7 in section on the line VIII-VIII.

The apparatus illustrated in FIGS. 7 and 8 is similar to that described above in that the stationary shaft 8 carries a driven sleeve 27 on which an annular pawl carrier 21 is fastened. Pawls 22 on the carrier are spring-biased toward engagement with ratchet teeth 32 on a coupling ring 33. Two centrifugal weights 24 not significantly different from the aforedescribed weights 4 and linked by nonillustrated gear rims are pivoted on pins 23 circumferentially spaced about 30° n a common circle about the hub axis, and are normally held near the sleeve 27 by a return spring corresponding to the aforedescribed spring 15, but not visible in the view of FIGS. 7 and 8.

The apparatus of FIGS. 7 and 8 is provided with a modified control member 25 which essentially consists of a flat ring coaxially rotatable on the sleeve 27 between the weights 24 and the pawl carrier 21 and an axial flange on the circumference of the ring and having two diametrically opposite notches 26. The flange of the control member 25 spacedly envelopes the pawl carrier 21 with a clearance sufficient to accommodate the pawls 22 in the retracted position. When the control member 25 is turned to align the pawls 22 radially with the notches 26, the pawl spring causes the tips of the pawls to project radially into the path of ratchet teeth 32 on a coupling ring 33. Relative rotation of the control disc 25 and of the pawl carrier 21 causes camming engagement between the axial edges of the flange at the notches 26 and the pawls to pivot the latter into the retracted position.

The control member 25 is turned between the position shown in FIG. 8 and the pawl-retracting position by a crank pin 30 on one of the weights 24 adjacent the associated pivot pin 23, the crank pin engaging a radial slot 31 in the ring portion of the control member 25. The angular displacement of the control member 25 relative to the pawl carrier 21 achieved by the pin 30 is small, but no more is needed for cammingly shifting the pawls 32 between the retracted and the active position.

Figure 9:
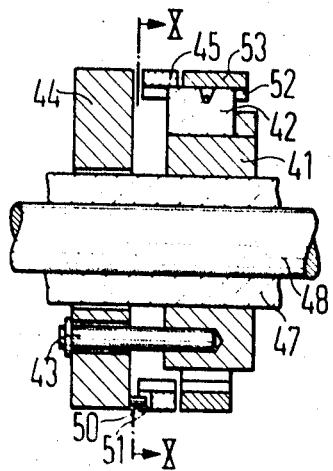
FIG. 9 is an axially sectional view of a third centrifugal governor of the invention.
Figure 10:
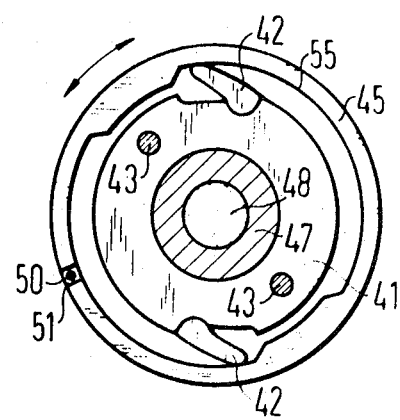
FIG. 10 shows the governor of FIG. 9 in section on the line X-X.

FIGS. 9 and 10 illustrate yet another speed governor arrangement of the invention in which the stationary hub shaft 48 rotatably supports a sleeve 47 associated with a nonillustrated ring gear, and fixedly carrying an annular pawl carrier 41. Two diametrically opposite pawls 42 on the carrier 41 are axially coextensive in part with a coupling ring 53 carrying ratchet teeth 52, and with a control ring 45.

Diametrically opposite portions of the pawl carrier 41 carry axially projecting pivot pins 43 on which respective ends of flyweights 44 are mounted, the flyweights being of the arcuate shape seen in FIG. 6. A crank pin 50 on one of the flyweights axially projects into a recess 51 of the ring 45, and thereby turns the ring relative to the pawl carrier 41 through a small angle when the flyweights 44 move away from the sleeve 47 against the restraint of a return spring (not shown).

The inner annular face of the ring 45 is cylindrical except for two diametrically opposite cam lobes which project in a radially inward direction from the otherwise cylindrical face. The radial clearances between the pawl carrier 41 and the cylindrical face portions and the cam lobes respectively are such, that the pawls 42 are released for engagement with the ratchet teeth 52 when radially aligned with the cylindrical face portions, and are retracted from engagement with the coupling ring 53 by the cam lobes. If it is desired to secure the two flyweights 44 against movement on the pivot pins 43 by forces other than the centrifugal forces generated by rotation of the pawl carrier 41, they may be connected with a linkage analogous to the linkage described with reference to FIG. 6.

Two pawls are normally preferred in pawl-and-ratchet couplings of the type described for a combination of adequate mechanical strength, static, and dynamic balance, and relatively small dimensions, but the centrifugal governor of the invention has been found to operate successfully with more than two pawls, and also with only one pawl. It has also been found that the radial positions of the pawls and ratchet teeth may be interchanged without difficulty, the pawl carrier being replaced by a ring with external ratchet teeth, and the coupling ring being modified to carry pivotally mounted pawls on its inner face. The interchange involves only minor dimensional changes in the control elements 5, 5a, and 25, and the provision of external cam lobes on the control member 45, as will be obvious.

Pawl-and-ratchet couplings have been used in bicycles for multiple-speed hubs capable of more than two transmission ratios, and the utility of the illustrated and described speed governors of the invention in such hubs is evident.

Each of the several embodiments of the invention discussed hereinabove differs from known centrifugal governors employed heretofore for the same or related purposes by the small number of moving parts, and the simple shape of these parts which permits them to be cast, stamped, or otherwise manufactured at very low cost to the required tolerances. Actual embodiments of this invention have been found to operate successfully over extended periods without requiring maintenance or repairs.

Two flyweights are generally preferred for the same reasons which make two pawls attractive. However, it has been found that the centrifugal governors of the invention are capable of controlling two or more pawls of a pawl-and-ratchet coupling by means of a single flyweight. The force required for shifting the control elements of the invention is small enough to be provided by a single flyweight dimensioned to fit into a bicycle hub of the usual dimensions. However several small flyweights are readily coupled to each other to supply an equivalent force in a smaller space, and the several flyweights are preferably of the arcuate shape illustrated.

I claim:

1. In a centrifugally controlled pawl-and-ratchet coupling for a multiple-speed hub of a bicycle and like vehicle, the coupling including a pawl carrier and a ratchet rotatable about a common axis, a pawl on said carrier, yieldably resilient means biasing said pawl toward torque transmitting engagement with said ratchet, a flyweight member mounted for rotation about an axis and for radial movement relative to said axis, return means biasing said member toward said axis, and control means for controlling engagement of said pawl with said ratchet in response to said movement of said member, the improvement which comprises:

a. mounting means securing said member to said pawl carrier for joint rotation about said common axis and for movement of said member relative to said common axis in a radially extending direction;

b. said control means including:

1. a control member rotatable about said common axis, 2. motion transmitting means connecting said control member to said flyweight member for displacement of the control member relative to said pawl carrier between two positions in response to said radial movement of the flyweight member; and 3. cam means on said control member disengaging said pawl from said ratchet in one of said positions of the control member.

2. In a coupling as set forth in claim 1, said mounting means pivotally fastening said flyweight member to said pawl carrier for angular movement relative to said common axis.

3. In a coupling as set forth in claim 1, said motion transmitting means angularly displacing said control member between said two positions, and said cam means having a cam face, the cam face having two portions angularly offset relative to said common axis and respectively nearer and farther from said axis.

4. In a coupling as set forth in claim 3, said motion transmitting means including a pin projecting from one of said members, the other member being formed with a recess receiving said member.

5. In a coupling as set forth in claim 3, said control member being annular about said common axis, and being formed with an aperture axially therethrough, said cam face bounding said aperture in a radially outward direction, and a portion of said pawl being movably received in said aperture for engagement by said cam face.

6. In a coupling as set forth in claim 1, said control member having a wall radially interposed between said pawl carrier and said ratchet, said wall being formed with a notch therein and having an edge portion bounding said notch, said edge portion constituting said cam means.

7. In a coupling as set forth in claim 1, a second flyweight member, mounting means securing said second flyweight member to said pawl carrier for joint rotation about said common axis and for movement relative to said common axis in a radially extending direction, and linking means linking said flyweight members for symmetrical movement relative to said common axis when one of said flyweight members moves in said radially extending direction.

8. In a coupling as set forth in claim 7, said linking means including gear means on each flyweight member, the gear means on said flyweight members being meshingly engaged.

9. In a coupling as set forth in claim 7, said flyweight members being axially offset from said pawl carrier, said mounting means including two mounting members axially extending from said pawl pawl carrier in a common direction and respectively carrying said flyweight members, and abutment means on said control member respectively engaging said mounting members in said two positions of said control member.

10. In a coupling as set forth in claim 9, a portion of said control member being axially interposed between said pawl carrier and said flyweight members and being formed with an opening therein, said mounting members being movably received in said opening.